June 13, 1950  H. H. MEINCKE  2,511,285
DEVICE FOR PACKING FRUIT

Filed June 18, 1948  3 Sheets-Sheet 1

H. H. Meincke
INVENTOR

BY C.A.Snow&Co.
ATTORNEYS.

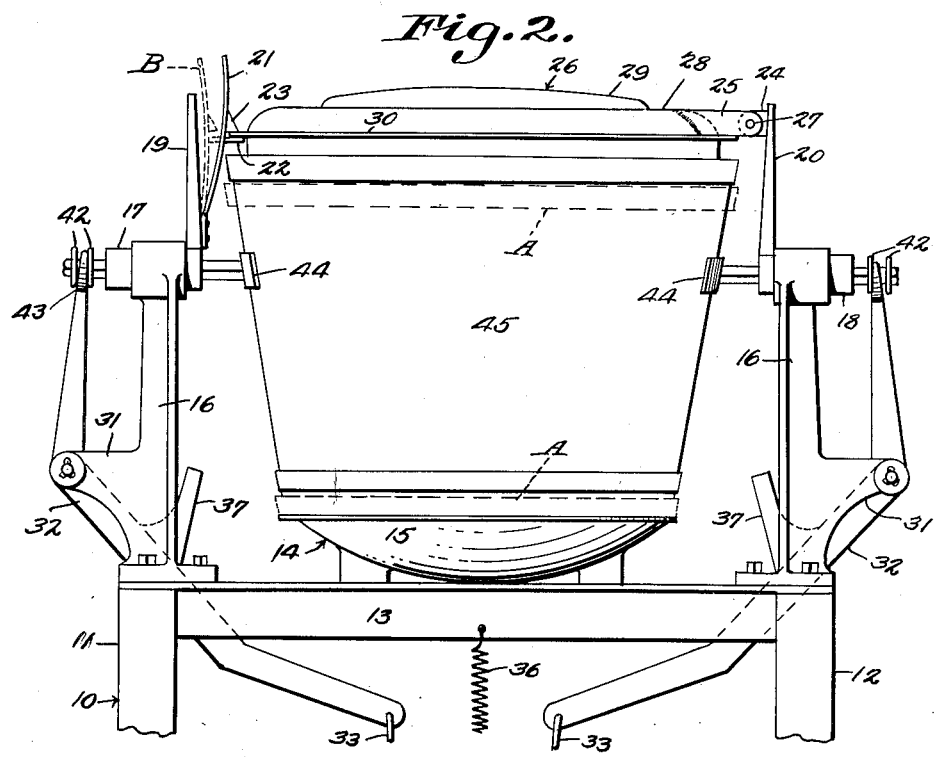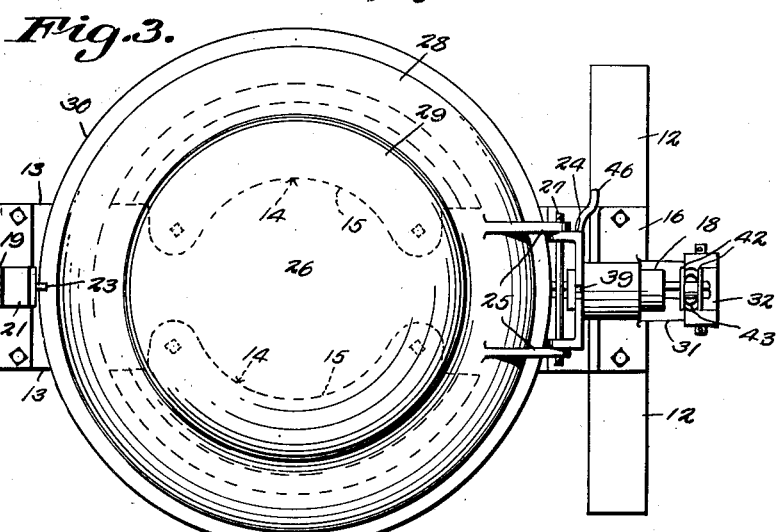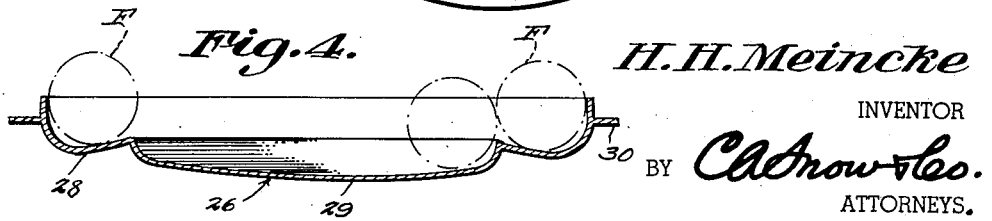

June 13, 1950   H. H. MEINCKE   2,511,285
DEVICE FOR PACKING FRUIT
Filed June 18, 1948   3 Sheets-Sheet 3
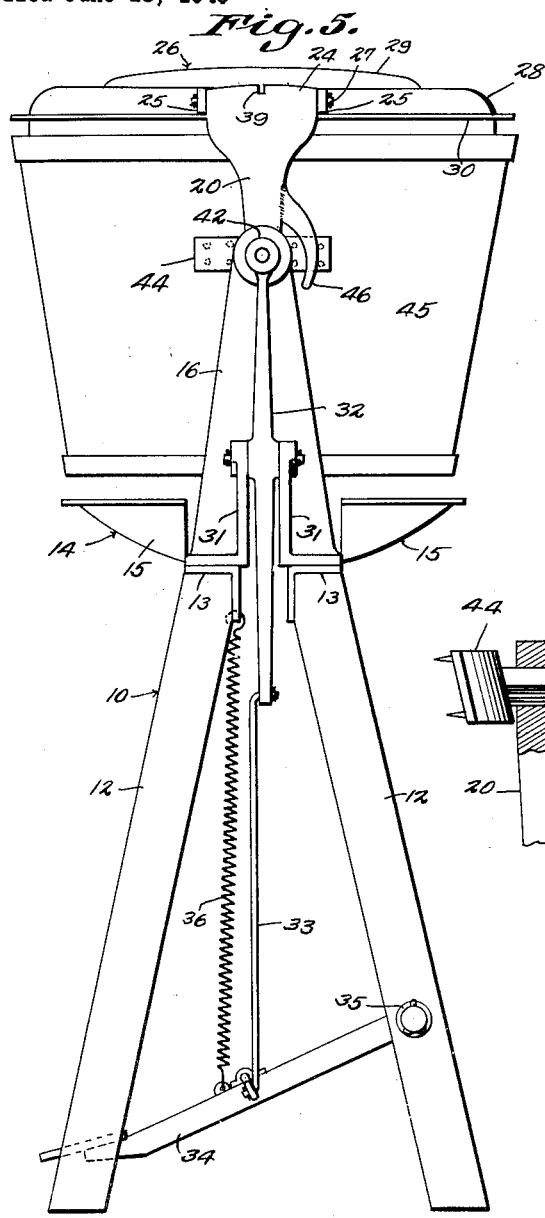
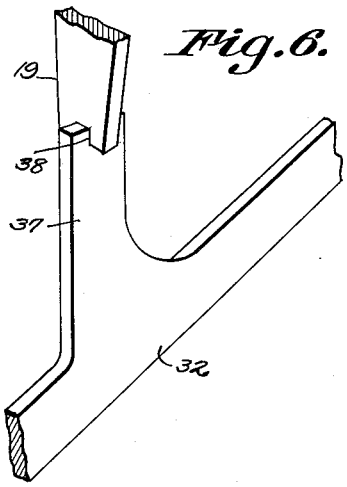
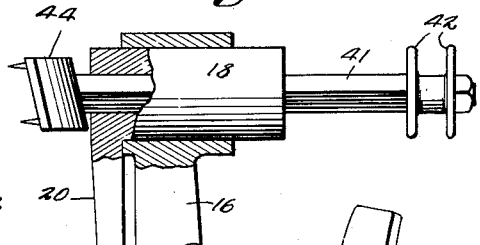
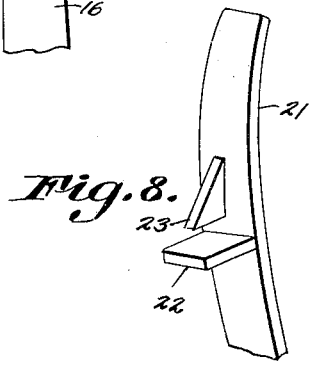
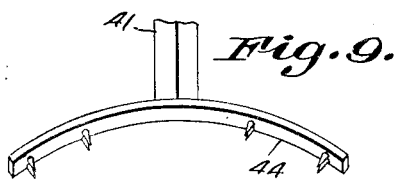
H. H. Meincke
INVENTOR
BY *C. A. Snow & Co.*
ATTORNEYS.

Patented June 13, 1950

2,511,285

UNITED STATES PATENT OFFICE 2,511,285

DEVICE FOR PACKING FRUIT

Henry H. Meincke, Howey in the Hills, Fla.

Application June 18, 1948, Serial No. 33,746

9 Claims. (Cl. 214—1)

This invention relates to a device for packing fruit in a container such as a bushel basket.

In the conventional method of packing a bushel basket with fruit, there is utilized a stand upon which is placed a palate which shapes the top layer of the fruit in the basket. After this layer has been placed upon the palate, a metal tub shaped like a bushel basket is positioned over the palate in an inverted position. A paper liner is then inserted in the tub, and the tub is then filled with the fruit. The tub is formed open at both ends. In its inverted position, therefore, its open top is closed by the palate on which the tub is placed, and the tub is filled with the fruit through the open bottom.

After the tub has been filled, it is removed, the fruit being held in place by the paper liner. A conventional wooden bushel basket is then inverted and placed over the fruit and liner and turned right side up for removal from the stand.

Most usually, the removal of the packed bushel basket is accomplished by manual labor. The baskets when packed are heavy, and considerable time and effort is expended in their removal from the stands, as will be appreciated.

Rolling the basket over, and lifting it from the stand, generally requires the services of someone other than the packer herself.

The main purpose of the present invention is to reduce materially the time and effort required for removing a packed basket from the stand. To this end, I provide a fruit packing device which in its basic aspects includes a supporting frame, a palate so mounted on the frame as to swing through a circular path, thus to permit a packed basket supported by the palate to be turned right side up, a clamp means that supports the basket to the palate during the operation of positioning the basket right side up, and a support or base on the frame to which the basket can drop when released by the clamp, and from which it can be readily slid or lifted from the device.

It is a further important object of the invention to provide a novel formation of the palate itself, that permits the top layer of fruit to be packed more efficiently than has heretofore been the case.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 2 is also a front elevational view, the lower portion of the frame being broken away, and a bushel basket being substituted for the tub and being turned right side up.

Figure 3 is a top plan view as it appears in Figure 2.

Figure 4 is a vertical section through the palate.

Figure 5 is a side elevational view of the device as it appears in Figure 2.

Figure 6 is an enlarged fragmentary perspective view showing a locking arrangement whereby the palate is held rigid during the packing of the metal tub.

Figure 7 is a fragmentary detail view, partly in elevation and partly in section, of one of the clamps.

Figure 8 is a fragmentary perspective view of a spring latch for the palate.

Figure 9 is a fragmentary perspective view of the gripping end of one of the clamps.

Figure 1:
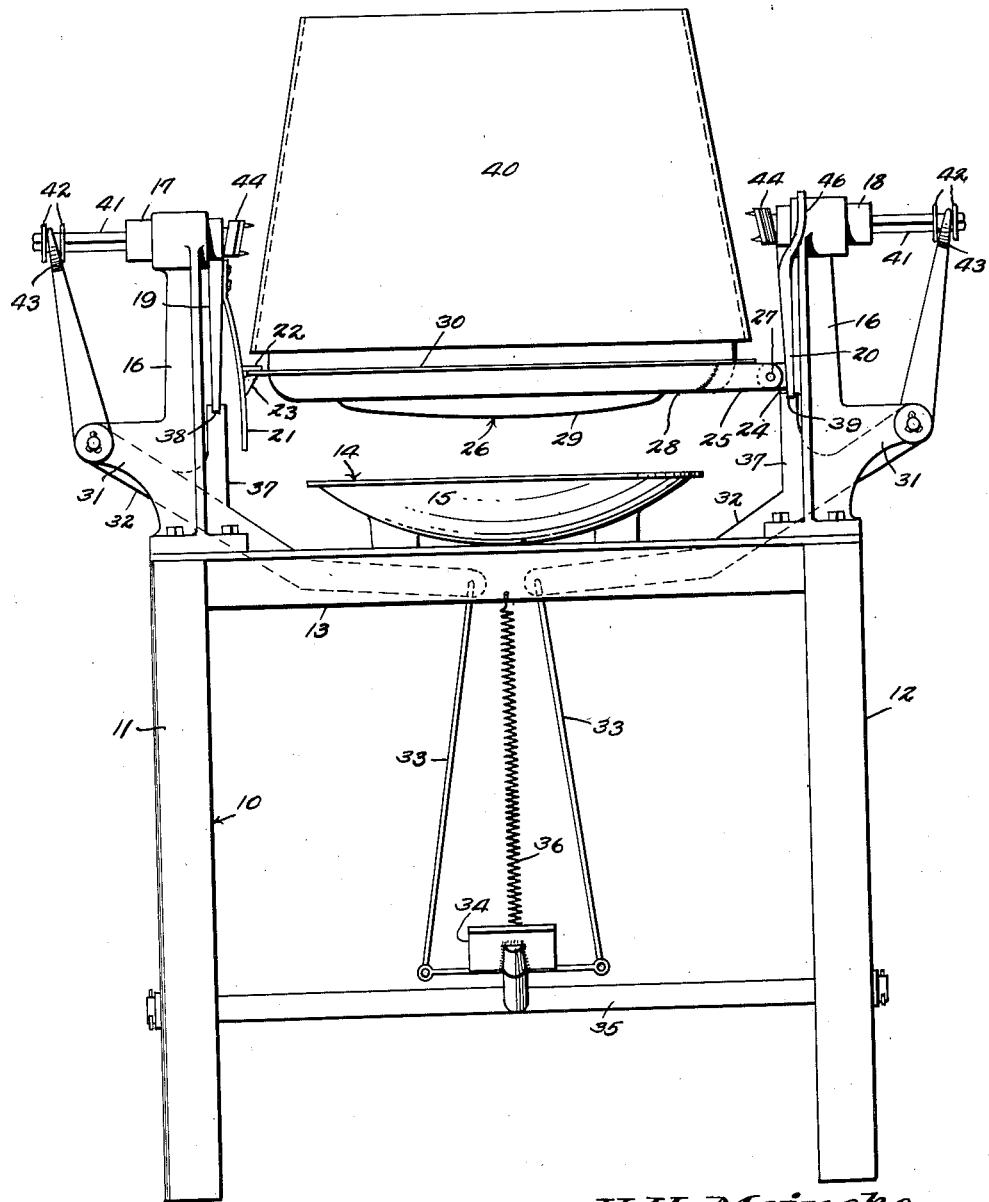
Figure 1 is a front elevational view of a fruit packing device constructed in accordance with the invention, a metal packing tub or form being positioned inverted upon the palate, the parts being positioned for the tub packing operation.

Referring to the drawings in detail, 10 is a supporting frame including a pair of uprights 11 at one side, and a corresponding pair of uprights 12 at the other side. Spaced parallel cross bars 13 extend between the uprights and are rigidly connected thereto by any suitable means.

A base 14 comprises opposed arcuate dished segments 15, rigidly secured to the respective cross bars. This is disposed medially of the frame.

Upstanding from the ends of the cross bars 13, and rigidly secured thereto, are opposed brackets 16, and journaled in the upper ends of the brackets are rotatable shafts 17 and 18. Integral with the respective shafts, and extended radially therefrom, are supporting arms 19 and 20, these constituting crank arms that support the palate, in a manner which will now be described. The arm 19 has secured to its inner face a spring latch 21, and rigid with this latch are the inwardly extended spaced latch members 22 and 23 (Fig. 8).

The arm 20 is integral at its outer end with an inwardly extended yoke 24, receiving ears 25 that project from the palate 26, ears 25 being hinged to the yoke by a pivot pin 27.

The palate is preferably formed as best shown in Fig. 4, being formed with an annular outer channel 28, surrounding a shallowly dished center portion 29. Conventional palates are merely shallowly dished without interruption to their outer peripheries. Thus, utilizing a conventional palate, the packer has difficulty packing the outer circle of the top layer of the fruit. While packing said outer circle, the packer often finds that the fruit will roll toward the center of the palate, away from the outer flange, and thus the packer must repack the entire outer circle of fruit.

Using a palate constructed as shown in Fig. 4, this difficulty is eliminated. Fruit F placed in the outer channel 28 rolls to the outer or peripheral flange of the palate, and thus the outer circle of fruit is all packed without possibility of disruption thereof.

Formed on the palate 26 is a surrounding peripheral flange 30. Referring to Fig. 1, this is received between the latch members 22 and 23, and thus the palate is supported by arms 19 and 20, for packing thereon of the top layer of fruit.

Since the arms 19 and 20 can swing, the palate would tend to move during this part of the packing operation. This tendency is restrained in a manner which will presently appear.

Cast with the brackets 16, and projected laterally and outwardly therefrom, are pairs of ears 31, each pair receiving and being pivotally connected to an angular lever 32. To the inner ends of the levers 32 are pivotally connected the upper ends of operating rods 33, pivotally connected at their lower ends to a treadle 34 that is fixed to and is projected radially from a cross member 35 journaled in the frame. The treadle is normally held in its upper position by a spring 36 connected to the treadle and to the upper portion of the frame, and as a result, the angular levers 32 are normally positioned as shown in Fig. 1.

From a medial portion of each lever is extended a projection 37, and in the position of the parts as shown in Fig. 1, the projections 37 are received in slots 38 and 39 of the arms 19 and 20 respectively. As a result, the arms 19 and 20 are kept from swinging, and thus the palate is held wholly stationary during the packing operation.

Assuming that the top layer of fruit has been packed on the palate, a metal form 40 is inverted and placed upon the palate, and a paper liner, not shown, is placed therein. The metal form or tub is now filled with fruit.

With the parts of the device still in the position of Fig. 1, the tub 40 is now removed, and the paper liner holds the fruit ready to receive the conventional bushel basket.

A clamp means is provided for opposite sides of the basket. Splined in non-circular bores of the shafts 17 and 18 are non-circular clamp arms 41. For the purpose of reciprocating these arms, so as to move them toward or away from each other, I provide on the outer ends of the clamp arms spaced collars 42, receiving forks 43 integral with the upper ends of the angular levers 32. Thus, when the treadle 34 is in its upper position, the clamp arms 41 are withdrawn, as shown in Fig. 1.

The inner ends of the clamp arms 41 have secured thereto arcuate clamping segments 44, curved to conform to the curvature of the bushel basket 45, and toothed to grip the basket.

Continuing with the operation of the device, the bushel basket 45 is inverted and substituted for the tub 40 of Fig. 1. The packer now presses downwardly on the treadle 34. This moves the clamping segments into gripping engagement with the basket 45, and at the same time swings projections 37 out of engagement with the slots 38 and 39. Basket 45 can now be turned right side up, the basket rotating on a transverse axis defined by the aligned axes of the shafts 17 and 18, the clamp arms 41 in effect forming trunnions concentric with the crank arms 19 and 20 upon diametrically opposite portions of the basket side wall. As the basket is turned right side up, the shafts 17 and 18 rotate, carrying with them the clamp arms 41 and the arms 19 and 20.

The parts are now positioned as in Fig. 2. Now it is only necessary for the packer to release the treadle 34, whereupon the clamps are withdrawn, and the bushel basket 45 drops to a position designated A in Fig. 2, in which position it is supported by the base 14. The packer pulls the spring latch 21 to a dotted line position designated B in Fig. 2, whereupon the palate 26 is swung on its hinge 27 upwardly. In this connection, the palate, being now supported entirely by the arm 20, might tend by reason of its weight to swing in its circular path towards its lower position shown in Fig. 1. However, this is prevented by a finger 46 extending from the arm 20, which is adapted to engage one side of the bracket 16.

Basket 45 can now be slid from the base 14, onto an adjacent conveyor or table.

After the basket has been removed, the parts are readily returned to position for the packing of the next basket, by returning the palate 26 into engagement with the spring latch 21, and allowing the palate to swing to its lower position, in which it can be locked by the projections 37.

For ready reference, it may be noted that the device can be said to break down into cooperating units. These comprise a supporting frame that includes the stationary members 10 through 16 inclusive; a palate structure that includes the palate 26 and the connections that mount the palate to the supporting frame for travel through a circular path; the reciprocable clamps; and the controls for the clamps and palate structure, including the angular levers and the foot treadle arrangement.

What is claimed is:

1. A fruit packing device including a supporting frame, a palate connected to the frame for travel through a circular path, means for locking the palate in a lower position, clamps movably mounted on the frame for supporting the basket to the palate, and means carried by the frame adapted to simultaneously move the clamps to basket-engaging position and release the palate from its lower position.

2. A fruit packing device including a supporting frame, opposed brackets upstanding therefrom, opposed shafts rotatable in the brackets, arms extended radially from the shafts, a palate supported by the free ends of the arms for travel through a circular path, and basket-engaging clamps slidable on the shafts.

3. A fruit packing device including a supporting frame, opposed brackets upstanding from the frame, opposed shafts rotatable in the bracket, arms extended radially from the shaft, a palate supported by the free ends of the arms for travel through a circular path, basket-engaging clamps slidable in and rotatable with the shaft, and opposed spring restrained levers pivoted to the frame and connected to the clamps for engaging and disengaging the clamps from a basket.

4. A fruit packing device as in claim 3, and including projections on the levers adapted to engage the arms when the levers are positioned to disengage the clamps.

5. A fruit packing device including a supporting frame, opposed brackets upstanding from the frame, opposed shafts rotatable in the brackets, arms extended radially from the shafts, a palate hingedly connected to one of the arms, a palate-engaging latch carried by the other arm, basket-engaging clamps slidable in and rotatable with the shafts, opposed spring restrained levers pivoted to the frame and connected to the clamps for engaging and disengaging the clamps from a basket, and projections on the levers adapted to engage the arms when the levers are positioned to disengage the clamps.

6. A fruit packing device including a frame, crank arms rotatable therein, a palate supported by and between the outer ends of said arms, basket-engaging clamps splined in the inner ends of the arms, said clamps being proportioned to grip opposite portions of the side wall of a basket supported upon the palate to provide trunnions concentric with said arms on which the basket may be rotated with the crank arms and palate, and means for shifting said clamps into and out of gripping engagement with said side wall.

7. A fruit packing device including a frame, crank arms rotatable therein, a palate supported by and between the outer ends of said arms, basket-engaging clamps splined in the inner ends of the arms and positioned to be shifted against diametrically opposite portions of the side wall of a basket supported upon the palate, teeth on said clamps adapted to bite into and grip said diametrically opposite portions, said clamps constituting trunnions concentric with said arms on which said basket may be rotated with the arms and palate, and means for shifting said clamps into and out of gripping engagement with the basket side wall.

8. A fruit packing device including a frame, crank arms rotatable therein, a palate supported by and between the outer ends of said crank arms, basket-engaging clamps splined in the inner ends of the arms, toothed arcuate segments mounted upon said clamps and positioned to bite into and grip diametrically opposite portions of the side wall of a basket supported by the palate at locations intermediate the top and bottom of said basket, said clamps providing trunnions concentric with the crank arms on which the basket may be rotated with the crank arms and palate, and means for simultaneously shifting the clamps into and out of gripping engagement with the basket side wall.

9. A fruit packing device including a frame, a pair of opposed crank arms mounted for rotation therein, a palate supported by and between the outer ends of the crank arms, basket-engaging clamps splined in the inner ends of the crank arms and shiftable toward and away from each other, means on the inner ends of said clamps proportioned to grip rigidly a basket side wall at diametrically opposite sides of said basket and intermediate the top and bottom of the basket when the basket is supported upon the palate, to provide trunnions concentric with said arms on which the basket may be rotated with the crank arms and palate, and means mounted on the frame and under the control of an operator and adapted for simultaneous shifting of the clamps into and out of gripping engagement with said basket side wall.

HENRY H. MEINCKE.

REFERENCES CITED

The following references are of record in the file of this patent:

UNITED STATES PATENTS

| Number | Name | Date |
|---|---|---|
| 1,655,134 | Clisson | Jan. 3, 1928 |
| 1,799,938 | Wadsworth | Apr. 7, 1931 |
| 2,157,642 | Vosler | May 9, 1939 |